(12) United States Patent
Rampson

(10) Patent No.: US 10,409,453 B2
(45) Date of Patent: Sep. 10, 2019

(54) GROUP SELECTION INITIATED FROM A SINGLE ITEM

(71) Applicant: Microsoft Technology Licensing, LLC, Redmond, WA (US)

(72) Inventor: Benjamin Edward Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 502 days.

(21) Appl. No.: 14/286,683

(22) Filed: May 23, 2014

(65) Prior Publication Data

US 2015/0339003 A1 Nov. 26, 2015

(51) Int. Cl.
*G06F 3/0482* (2013.01)
*G06F 3/0486* (2013.01)
*G06F 3/0484* (2013.01)
*G06Q 10/10* (2012.01)

(52) U.S. Cl.
CPC .......... *G06F 3/0482* (2013.01); *G06F 3/0486* (2013.01); *G06F 3/04842* (2013.01); *G06Q 10/107* (2013.01)

(58) Field of Classification Search
CPC .................................................... G06F 3/0482
See application file for complete search history.

(56) References Cited

U.S. PATENT DOCUMENTS

| | | | | | |
|---|---|---|---|---|---|
| 5,680,152 | A | * | 10/1997 | Bricklin | G06F 3/0481 345/419 |
| 5,689,665 | A | * | 11/1997 | Mitsui | G06F 3/0481 715/803 |
| 5,717,924 | A | * | 2/1998 | Kawai | G06F 17/30595 |
| 5,930,799 | A | * | 7/1999 | Tamano | G06F 17/30 |
| 6,101,493 | A | * | 8/2000 | Marshall | G06F 17/30572 |
| 6,626,959 | B1 | | 9/2003 | Moise et al. | |
| 6,629,097 | B1 | * | 9/2003 | Keith | G06F 17/30598 |
| 6,636,250 | B1 | * | 10/2003 | Gasser | G06F 3/0481 715/733 |
| 6,738,770 | B2 | * | 5/2004 | Gorman | G06F 17/246 707/723 |
| 7,188,316 | B2 | * | 3/2007 | Gusmorino | G06F 16/168 715/764 |
| 7,424,668 | B2 | | 9/2008 | Despain | |
| 7,441,186 | B2 | | 10/2008 | Kasperkiewicz et al. | |
| 7,552,139 | B2 | | 6/2009 | Smith et al. | |

(Continued)

FOREIGN PATENT DOCUMENTS

CN 1666200 A 9/2005
CN 101124574 A 2/2008
(Continued)

OTHER PUBLICATIONS

Greg Shultz; Weed Through your files Part Two: Windows 7 Group by and Filter features; Mar. 17, 2011; pp. 12.*

(Continued)

*Primary Examiner* — Phenuel S Salomon
(74) *Attorney, Agent, or Firm* — Christopher J. Volkmann; Kelly, Holt & Christenson, PLLC

(57) ABSTRACT

A user interacts with a predefined portion of a given data item in a set of structured data. All other items in the set of structured data, that have the same value as the given data item, in a corresponding portion, are selected and treated as a group.

20 Claims, 12 Drawing Sheets

(56) References Cited

U.S. PATENT DOCUMENTS

| | | | |
|---|---|---|---|
| 7,559,034 B1* | 7/2009 | Paperny | G06F 9/44526 |
| | | | 345/629 |
| 8,706,749 B1 | 4/2014 | Klaren et al. | |
| 8,745,058 B1* | 6/2014 | Garcia-Barrio | ............... |
| | | | G06F 17/30058 |
| | | | 707/737 |
| 2003/0046280 A1* | 3/2003 | Rotter | G06F 19/322 |
| 2005/0246352 A1* | 11/2005 | Moore | G06F 17/30067 |
| 2007/0209018 A1* | 9/2007 | Lindemann | G06F 3/04855 |
| | | | 715/784 |
| 2008/0086356 A1* | 4/2008 | Glassman | G06Q 30/0242 |
| | | | 705/14.41 |
| 2008/0275867 A1 | 11/2008 | Hollemans et al. | |
| 2009/0210828 A1* | 8/2009 | Kahn | G06F 17/241 |
| | | | 715/854 |
| 2011/0242130 A1* | 10/2011 | Toba | G06T 11/00 |
| | | | 345/629 |
| 2011/0271282 A1 | 11/2011 | Sutter et al. | |
| 2011/0289083 A1 | 11/2011 | Fisher | |
| 2012/0127066 A1 | 5/2012 | Iida et al. | |
| 2013/0156275 A1* | 6/2013 | Amacker | G06K 9/00677 |
| | | | 382/118 |
| 2013/0307992 A1* | 11/2013 | Erlandsson | G06F 17/30265 |
| | | | 348/164 |
| 2014/0149469 A1* | 5/2014 | Ghadge | G06F 17/30289 |
| | | | 707/805 |

FOREIGN PATENT DOCUMENTS

| | | |
|---|---|---|
| CN | 102208102 A | 10/2011 |
| WO | WO 2013/112354 A1 | 8/2013 |
| WO | WO 2014/014847 A1 | 1/2014 |

OTHER PUBLICATIONS

International Search Report and Written Opinion for International Application No. PCT/US2015/031864, dated Sep. 1, 2015, date of filing: May 21, 2015, 12 pages.

Second Written Opinion for International Patent Application No. PCT/US2015/031864, dated Apr. 29, 2016, date of filing: May 21, 2015, 5 pages.

"Pivot Table Tricks to Make You a Star", Published on: Jan. 27, 2010, Available at: http://chandoo.org/wp/2010/01/27/pivot-table-tricks/.

International Preliminary Report on Patentability for International Patent Application No. PCT/US2015/031864, dated Aug. 11, 2016, date of filing: May 21, 2015, 10 pages.

"Office Action Issued in European Patent Application No. 15728282.3", dated Aug. 21, 2018, 8 Pages.

"First Office Action and Search Report Issued in Chinese Patent Application No. 201580026755.1", dated Mar. 8, 2019, 14 Pages.

* cited by examiner

| | NAME | DATE | TYPE | SIZE |
|---|---|---|---|---|
| ☐ | DSC_6185.JPG | 12/23/2012 5:09 PM | JPEG image | 3,405 KB |
| ☐ | DSC_1685.NEF | 12/23/2012 5:09 PM | NEF File | 8,398 KB |
| ☐ | DSC_1687.JPG | 12/23/2012 5:09 PM | JPEG image | 3,461 KB |
| ☐ | DSC_1687.NEF | 12/23/2012 5:09 PM | NEF File | 8,397 KB |
| ☒ | DSC_6189.JPG | 12/23/2012 5:10 PM | JPEG image | 3,589 KB |
| ☐ | DSC_1689.NEF | 12/23/2012 5:10 PM | NEF File | 8,435 KB |
| ☐ | DSC_6191.JPG | 12/23/2012 4:12 PM | JPEG image | 4,330 KB |
| ☐ | DSC_1691.NEF | 12/23/2012 4:12 PM | NEF File | 9,518 KB |
| ☐ | DSC_6192.JPG | 12/23/2012 4:12 PM | JPEG image | 4,402 KB |
| ☐ | DSC_1692.NEF | 12/23/2012 4:12 PM | NEF File | 9,567 KB |
| ☐ | DSC_6193.JPG | 12/23/2012 4:12 PM | JPEG image | 4,128 KB |
| ☐ | DSC_1693.NEF | 12/23/2012 4:10 PM | NEF File | 9,123 KB |

FIG. 4

GROUP SELECTION INITIATED FROM A SINGLE ITEM

BACKGROUND

Computer systems are currently in wide use. Many computer systems allow users to access structured data.

For example, applications and other computer programs are often deployed in a wide variety of different computing environments. They often allow a user to access, and interact with, structured data. The data can be structured in a wide variety of different ways. For instance, it can be hierarchically arranged data, data provided in a table, data provided in a list, or data provided in another structured form. The data, itself, can also take a wide variety of different forms. For example, the data can include objects, files, list items, or other types of data. Some examples of applications that provide data in a structured way include spreadsheet applications, word processing applications that generate tables, electronic mail or other messaging applications that illustrate messages either as a list (such as in an inbox), or arranged in conversations (which is an example of hierarchically arranged, structured data). Still other applications that generate structured data include financial applications that provide customer lists, inventory lists, timesheet and expense report data. These are examples of applications only.

When interacting with this type of structured data, users often wish to perform some action on a plurality of different data items, all of which have some type of commonality. For instance, when a user is browsing a folder of images, the user may wish to transfer only the images that were captured on a certain day to another folder. In that case, the creation date of the image is an item of commonality. In addition, when a user is importing images from a camera that simultaneously shoots both raw and JPG file formatted images, it may be that the user only wishes to move either the raw or JPG formatted images to a separate folder. As another example, when working on a table of data in a spreadsheet application, the user may wish to take a set of entries with a similar value (such as all entries in the table with the same product category) and plot them on a chart or pivot table.

Selecting a group of data items represented in a structured way has been relatively time consuming and cumbersome. In addition, as touch-based devices (which often do not have a keyboard) become more common, selecting items of structured data has also become more difficult. The touch gestures that a user can initiate with a touch device (such as a stylus or the user's finger) can be less precise than those provided through a keyboard and/or a point-and-click device (such as a mouse or track ball).

Even so, some touch-based applications have a multi-select mode which the user can enter. This mode allows the user to tap on multiple different objects individually in order to add them to a current group selection. Other touch-based applications allow the user to use a special gesture (such as touch and hold) to add multiple items to a group. Other applications have the user perform a search (such as by using a search box) in order to narrow the data items that are displayed to a desired group, and then use a "select all" option to select all items in the displayed group of data items.

All of these techniques are somewhat slow and cumbersome to use. Some of them require the user to know special commands or gestures, and others add steps to the selection process, which can lead to a less desirable user experience.

The discussion above is merely provided for general background information and is not intended to be used as an aid in determining the scope of the claimed subject matter.

SUMMARY

A user interacts with a predefined portion of a given data item in a set of structured data. All other items in the set of structured data, that have the same value as the given data item, in a corresponding portion, are selected and treated as a group.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4 is one example of a user interface display.

DETAILED DESCRIPTION

Figure 1:
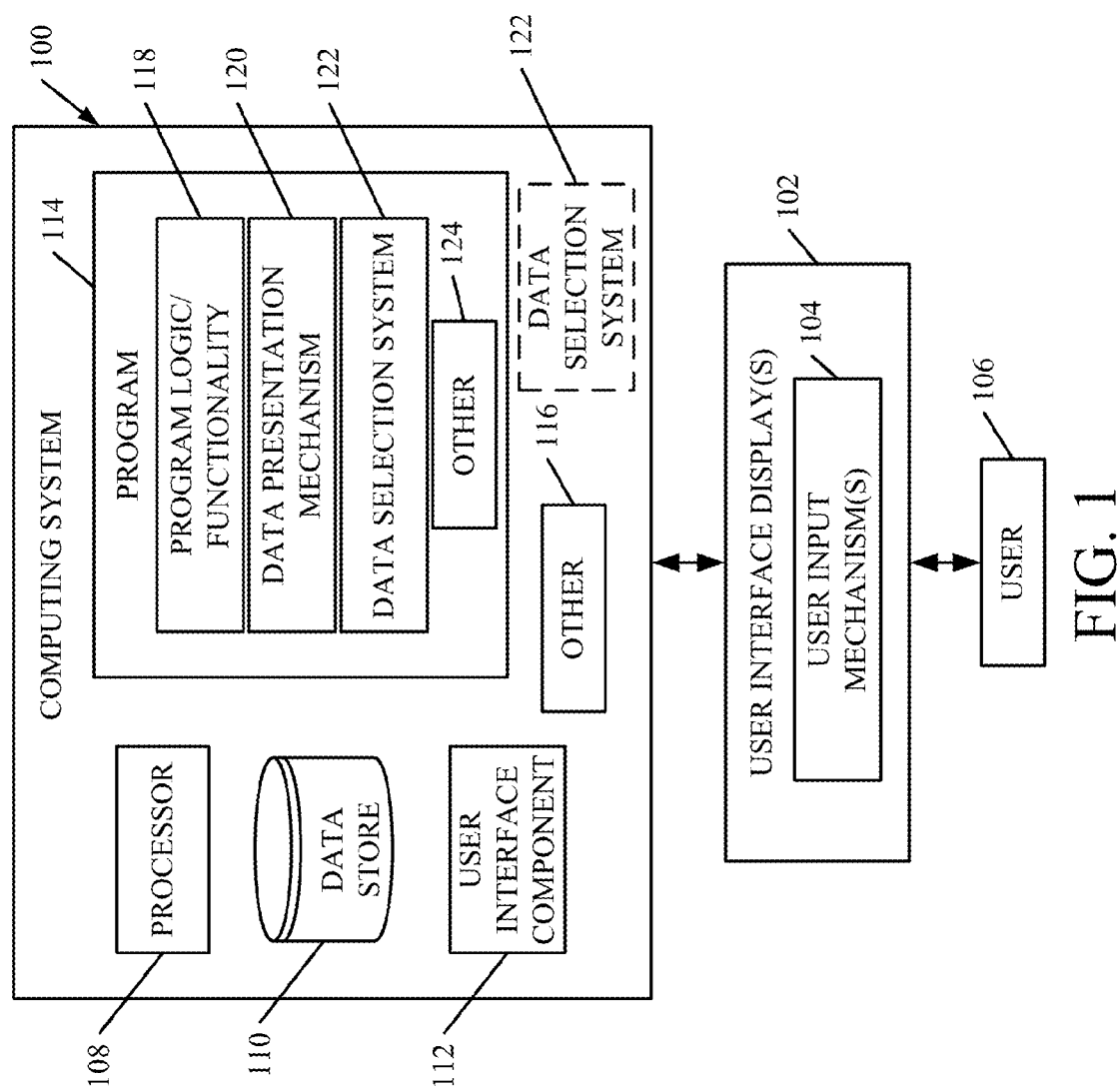
FIG. 1 is a block diagram of one example of a computing system.

FIG. 1 shows one embodiment of a block diagram of a computing system 100. Computing system 100 illustratively generates user interface displays 102, with user input mechanisms 104, for interaction by user 106. User 106 interacts with user input mechanisms 104 in order to control and manipulate computing system 100.

In the embodiment shown in FIG. 1, computing system 100, itself, illustratively includes processor 108, data store 110, user interface component 112, one or more programs 114, and it can include other items 116 as well. Program 114 illustratively generates data in a structured way, and allows user 106 to access and interact with that data. Program 114 can be an application program or any other type of program that does this.

By way of example only, program 114 can include a spreadsheet application, an electronic mail or other messaging application, a word processing application, a variety of different business applications (such as general ledger or other accounting applications, inventory tracking applications, business opportunity tracking applications, vendor tracking applications, or any of a wide variety of other applications or programs used in an enterprise resource planning (ERP) system or a customer relations management (CRM) system or other business system), among others.

In any case, program 114 illustratively includes program functionality 118, some type of data presentation mechanism 120, data selection system 122, and it can include other items 124 as well. The logic or functionality 118 of program 114 illustratively allows user 106 to view and manipulate data. Data presentation mechanism 120 illustratively presents the data to user 106 in a structured way. Data selection system 122 allows user 106 to select a group of data items as is described in greater detail below with respect to FIGS. 2-5.

It will also be noted that, in the embodiment shown in FIG. 1, data selection system 122 is shown as being within, and a part of, program 114. However, it can also be located external to program 114, and accessed by program 114. This is indicated by the dashed box shown in FIG. 1.

User interface component 112 illustratively generates user interface items, such as displays 102, either directly or under the control of other items in computing system 100. The user interface items can be provided for interaction with user 106.

Data store 110 illustratively stores data for computing system 100. It is shown as being part of computing system 100, but it can be remote from system 100 or distributed in other ways as well. It can store data that is acted on by program 114, as well as data acted on by other programs, and it can store other information as well.

Figure 2:
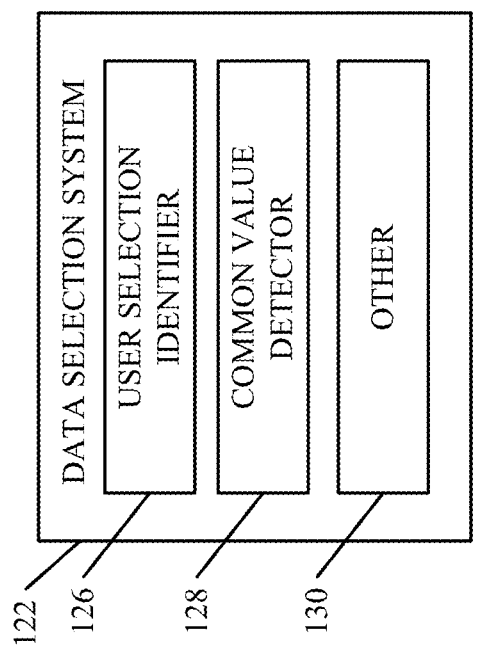
FIG. 2 is a more detailed block diagram of one example of a data selection system.

Before describing one embodiment of the overall operation of computing system 100 in allowing a user to group data, a more detailed description of one embodiment of data selection system 122 will first be provided. FIG. 2 shows a more detailed block diagram of one embodiment of data selection system 122. In FIG. 2, system 122 is shown with user selection identifier 126 and common value detector 128. System 122 can have other items 130 as well.

Figure 3:
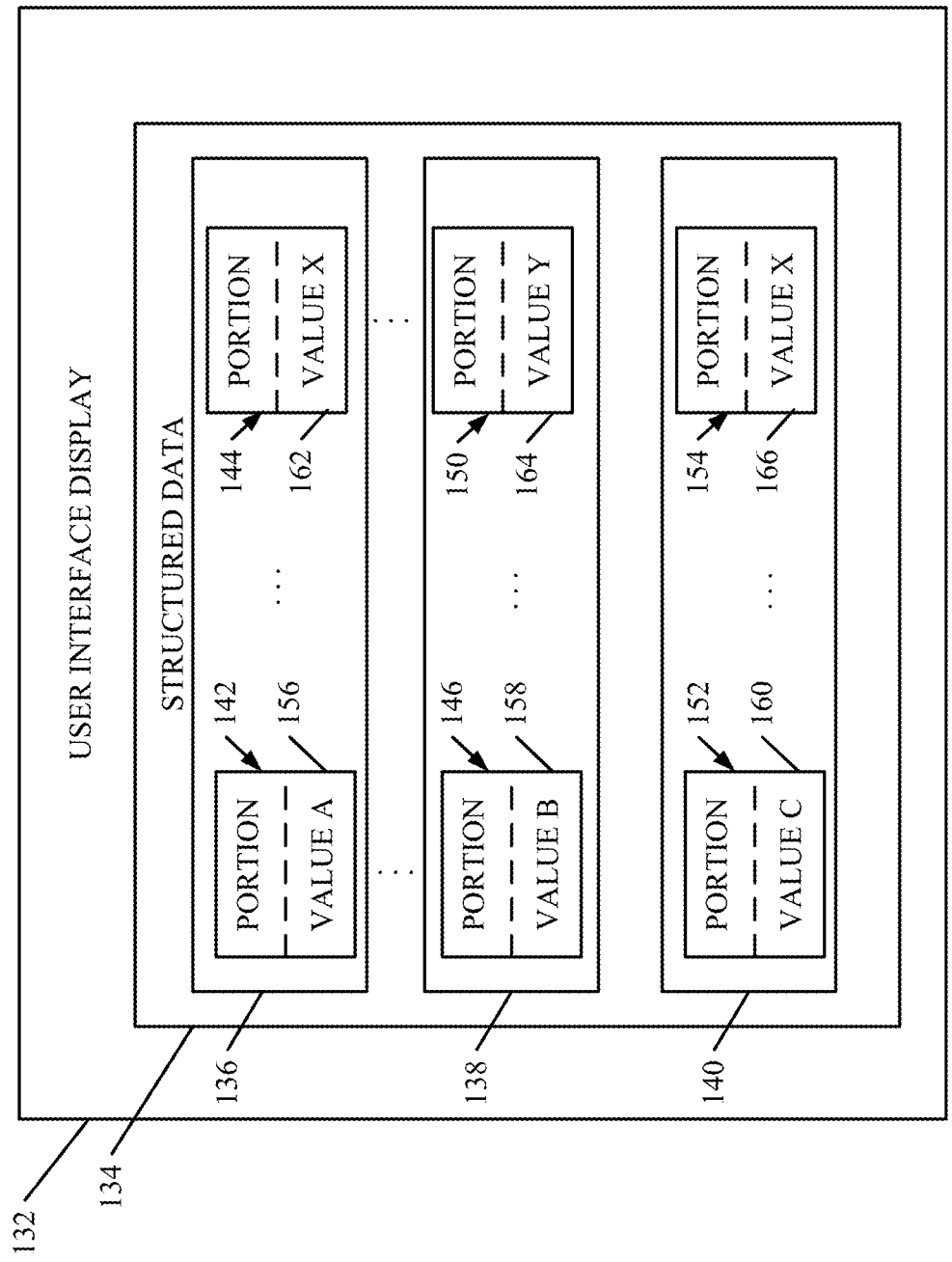
FIG. 3 is a block diagram of one example of a user interface display showing structured data.

FIG. 3 is a block diagram of one example of a user interface display 132 that displays a set of structured data 134. Data 134 illustratively includes data items 136, 138 and 140. While three data items are shown, it will be appreciated that fewer or more data items can be included in a set of structured data 134.

Each data item has a plurality of different portions. For instance, data item 136 has portions 142-144. Data item 138 has portions 146-150 and data item 140 has portions 152-154. As but one example, assume that user interface display 132 is showing structured data 134 as a list of messages in a user's electronic mail inbox. Thus, each of the data items 136, 138 and 140 correspond to a different electronic mail message.

Each of the portions in data items 136, 138 and 140 correspond to a different portion of the displayed data item. For instance, portions 142, 146 and 152 illustratively correspond to a sender's name. Thus, portion 142 has a value 156 which represents the name of the sender of the electronic mail message represented by data item 136. Portion 146 has a value 158 that represents the sender of the electronic mail message represented by data item 138, and portion 152 has a value 160 that identifies the sender of the electronic mail message represented by data item 140. Portions 144, 150 and 154, in the present example, represent the date on which the corresponding electronic mail message was sent. For instance, portion 144 of data item 136 has a value 162 that represents the date on which the corresponding electronic mail message was sent. Portion 150 has a value 164 that represents the date on which that corresponding mail message was sent, and portion 154 has a value 166 that also represents the date on which the corresponding mail message was sent. It can be seen in FIG. 3 that the electronic mail messages are displayed in alphabetical order based upon the values in the sender portions 142, 146 and 152.

In some current systems, if the user wishes to select all items sent on a given day, the user would normally need to either enter a special multi-selection mode, or know a specific user input action (such as a keystroke sequence, etc.) or the user would need to perform multiple operations (such as sort the messages by date and then perform a multi-select operation).

However, in accordance with one embodiment, user 106 simply needs to interact with some data portion that has group select behavior applied to it. For instance, if the developer of the application that presents structured data 134 applies group select behavior to the date portions 144, 150 and 154, then, in order to select a group of messages with a common date, the user interacts with the date portion on one of the messages.

By way of example, assume that user interface display 132 is a touch-enabled display and the application that generates data 134 is a touch-enabled application. In the embodiment shown in FIG. 3, if the user touches portion 144, then user selection identifier 126 (of data selection system 122 shown in FIG. 2) illustratively identifies that the user has selected portion 144 (a portion which has group select behavior applied to it). Common value detector 128 then identifies all other data items in structured data 134 that have a value for the corresponding portion that is the same as the value in the selected portion. For example, it can be seen in FIG. 3 that the data item 140 has the same value 166 as value 162, for the corresponding portion of the data item (that is, the date portions 144 and 154). Thus, common value detector 128 identifies data items 136 and 140 as having the same value in corresponding data portions. Based upon the user interacting with (e.g., touching) portion 144, and based upon the detected commonality, user selection identifier 126 selects both data items 136 and 140 and treats them as a group. User 106 can then interact with those data items as a group (such as by moving them to a different location, dragging them onto a selected visualization, etc.).

Figure 5:
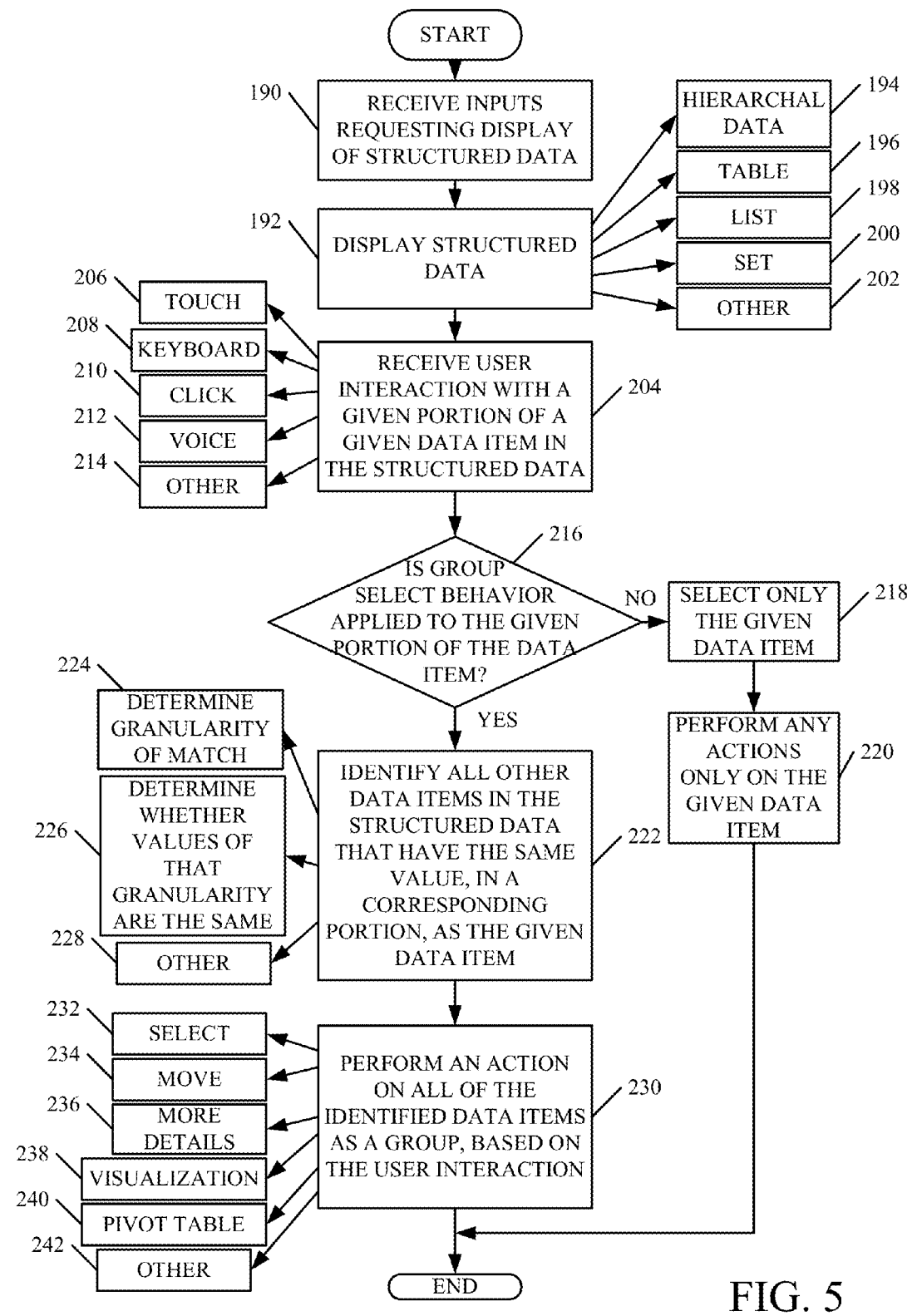
FIG. 5 is a flow diagram illustrating one embodiment of the operation of the computing system shown in FIG. 1.

A discussion of a more detailed example may be helpful. FIG. 4 shows a more detailed example of a user interface display 170 that displays a set of structured data 172. FIG. 5 is a flow diagram illustrating one embodiment of the operation of data selection system 122 in more detail. FIGS. 4 and 5 will now be described in conjunction with one another.

The set of structured data 172 shown in FIG. 4 is a view that can be generated, for example, by a file explorer component in computer system 100. The set of structured data 172 displays a set of files, some of which have attributes with repeating values. The attributes or portions of the structured data 172 include name portion 174, date portion 176, file type portion 178 and file size portion 180. Each row in the structured data 172 represents a different data item, in this case a file. The file name portion 174 displays the name of the file. The file date portion 176 displays the date when the file was created. The file type portion 178 identifies the file type and the file size portion 180 identifies the size of the corresponding file.

In some current systems, when a user touches anywhere in a row of structured data 172, the corresponding list item that the user touched is selected. However, in accordance with one embodiment of the present system, some portions of each data item (e.g., each row) have group select behavior applied to them. Therefore, if the user interacts with that portion of a given data item, then data selection system 122 illustratively identifies all other data items in the set of structured data 172 that have the same value in the corresponding portion, and selects all of those items so that they can be treated as a group.

By way of example, it can be seen that both the date portions 176 and type portions 178 of the various data items in the set of structured data 172 have repeating values. For instance, there are multiple items with a date value of "12/23/2012 5:09 PM", and there are multiple data items that have a value of "JPG Image" in the file type portion 178. Also, there are a plurality of different data items that have a value of "12/24/2012 4:12 PM" in the date portion 176 and that have a value of "NEF File" in the file type portion 178. If the developer of the program that generates structured data 172 applies group select behavior to either of the data portions 176 or 178, then when the user interacts with (such as touches) either data portion 176 or data portion 178 of a given data item, then data selection system 122 identifies other data items that have the same value and groups them together.

FIG. 5 is a more detailed flow diagram illustrating the operation of data selection system 122 (shown in FIG. 2) in doing this. As one example, program 114 first receives inputs requesting display of structured data. This is indicated by block 190 in FIG. 5. User 106 can, for instance, access a file explorer (which may be program 114) and request display of the files shown in FIG. 4.

In response, data presentation mechanism 120 displays the structured data requested by the user. This is indicated by block 192 in FIG. 5. It will be appreciated that the list of structured data 172 shown in FIG. 4 is only one example. The structured data can be presented in a wide variety of different structures. For instance, it can be hierarchical data 194, it can be a table 196, it can be a list 198, it can be another set of data 200, or it can be provided in other ways 202.

User selection identifier 126 then identifies user interaction with a given portion of a given data item in the structured data. This is indicated by block 204. For instance, data selection identifier 126 detects that the user has interacted with a given portion 174, 176, 178 or 180 of a given data item in the structured data 172. The user interaction can take a wide variety of forms as well. For example, the user interaction can be a touch interaction 206, a keyboard interaction 208, a click interaction 210 from a point-and-click device, a voice interaction 212 where the program is a speech-enabled application, or it can include a wide variety of other interactions 214.

User selection identifier 126 then determines whether group select behavior has been applied to the given portion of the data item that the user has interacted with. This is indicated by block 216. For instance, it may be that the developer of the program that generates structured data 172 wishes the group selection behavior to apply only to certain portions of each data item. If the group selection behavior has not been applied to the particular portion of the data item that the user interacted with, then processing continues at block 218 where only the given data item is selected, and any actions performed with respect to that data item are performed only on the given data item. This is indicated by block 220. By way of example, if the user wishes to move the data item, then only that data item will be moved based on a subsequent user input, because only that data item is selected.

However, if, at block 216, group select behavior is applied to the particular portion of the data item that the user interacted with, then processing proceeds to block 222. In that case, common value detector 128 examines all of the other data items in the set of structured data 172 to identify those data items that have the same value, in a corresponding portion, as the data item that the user interacted with. By way of example, if the user touched the file type portion 178 of the first data item in the list of structured date 172, then common value detector 128 examines all of the other data items to see which of them have the value "JPG Image" in the file type portion 178. Similarly, if the user touched the date portion 176 of the first data item in structured data 172, the common value detector 128 identifies all other items in structured data 172 that have the value "12/23/2012 5:09 PM" in the date portion 176.

It should be noted that the developer can tokenize the data items in various ways. For instance, based upon a given program, it may be that the developer will divide the date portion 176 into a day/year portion and a time portion. It may also be that the developer will apply the group select behavior if only the day/year portion have common values. Thus, in that case, data selection system 122 will select all data items in structured data 172 that were created on 12/23/2012, regardless of the particular time that they were created.

In yet another embodiment, the developer may tokenize the data by combining data portions. As an example, it may be that the developer tokenizes the data items so that two or more portions must have a common value in order for the data item to be selected as part of the group. For instance, it may be that, if the user interacts with either the date portion 176 or the type portion 178 of a data item, then common value detector 128 will examine both portions and will only select data items from structured data 172 to be part of the group if both portions have the same value. Thus, if the user touches either the date or type portion of the first data item in structured data 172, and if the developer has tokenized the structured data to combine those two portions, then common value detector 128 will identify only the other data items that were created on 12/23/2012 at 5:09 PM, and are of the JPG image type. It would therefore select only the first, third and fifth data items from structured data 172. Determining the granularity of the tokenization of portions of the data item that are to match in order to apply group select behavior is indicated by block 224. Determining whether the values of that granularity are the same is indicated by block 226. Common value detector 128 can detect common values in other ways as well, and this is indicated by block 228.

Once all of the data items with a common value in the given data portion have been identified, then group selection identifier 128 treats them as a selected group, based upon any further user interactions. This is indicated by block 230. By way of example, if the user simply touches a given data portion and then lifts his or her finger off of the display, then user selection identifier 126 simply selects all of the identified data items as being part of a group. Selecting is indicated by block 232. However, if the user touches a data portion and then slides his or her finger along the screen, then user selection identifier 126 will move all of the identified data items along with the particular data item that the user is touching. Moving the identified data items as a group is indicated by block 234. In another embodiment, the user can provide an input gesture indicating that the user wishes to have more detailed information displayed for the data items. In that case, the system generates a more detailed display for all of the identified data items that are part of the group. Generating a more detailed display is indicated by block 236.

In another embodiment, the user can indicate a particular visualization which the user wishes to be applied to the data items. By way of example, the user can drag the data item onto a chart or another type of visualization. In that case, the system drags all of the identified data items in the selected group and displays them according to that visualization. This is indicated by block 238 in FIG. 5.

In yet another embodiment, the user may wish to see the selected data items in a pivot table. In that case, the user can drag the data item onto a pivot table or otherwise indicate that the user wishes to see the selected items on a pivot table. The system then displays all of the identified data items that are part of the group in a pivot table. This is indicated by block 240.

Of course, all of these actions are only examples, and a variety of other actions can be taken by the user. In that case, the system treats all of the identified data items as a group and performs the given action on the group. Performing other actions is indicated by block 242 in FIG. 5.

It will be noted that the present discussion can apply to data in a table or list form or in any other structured form in other applications or programs. By way of one example, if the program is a spreadsheet application and the structured data is a table of sales data that has product categories, the user can simply touch one data item on the product category portion and drag that data item onto a pivot table. In response, the system will identify all other data items in the table, with the same product category value, and display them on the picot table as well. This can be done for other visualizations, or other actions can be performed as mentioned above.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
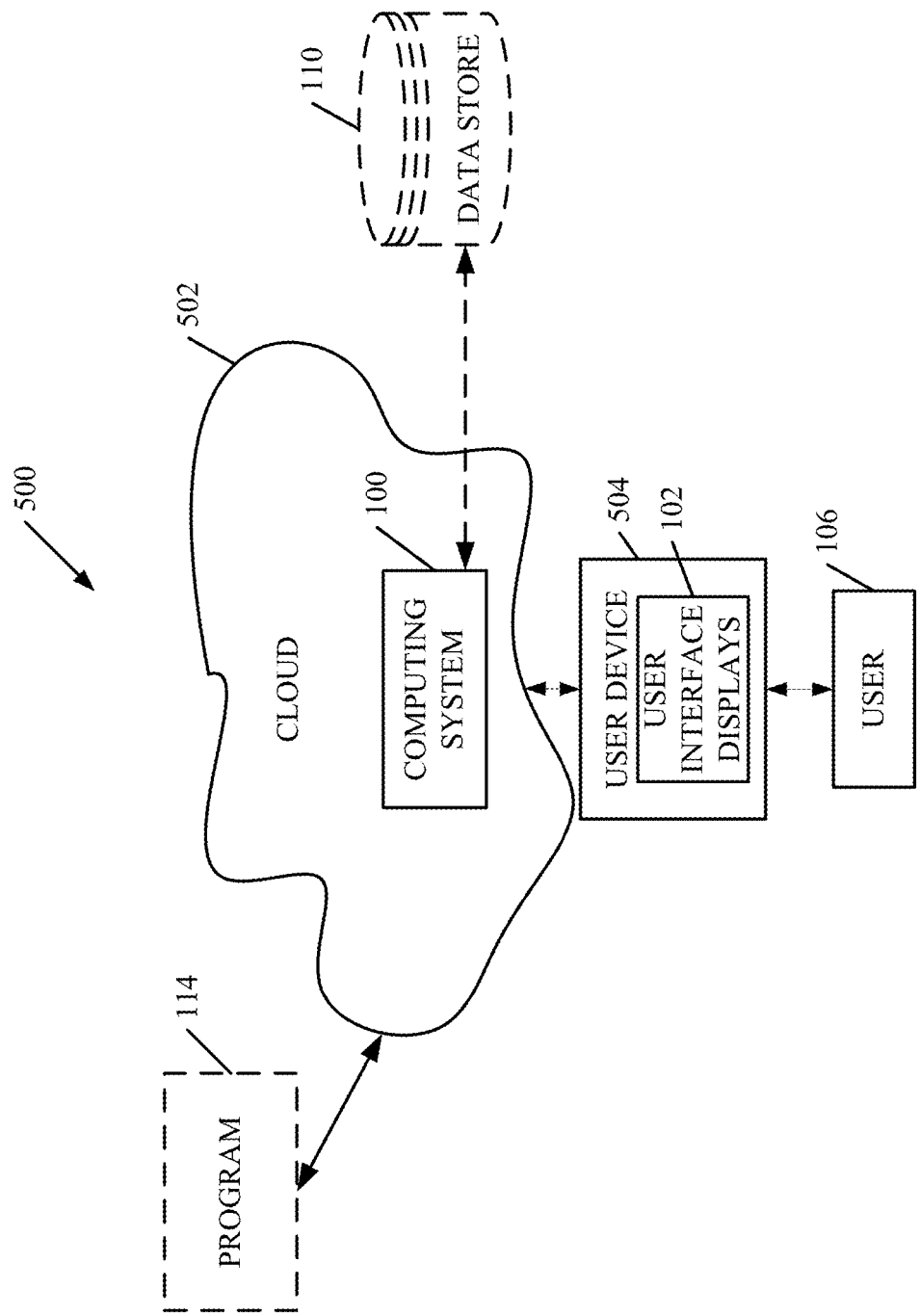
FIG. 6 is a block diagram of the computing system shown in FIG. 1 deployed in a cloud computing architecture.

FIG. 6 is a block diagram of computing system 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that computing system 100 is located in cloud 502 (which can be public, private, or a combination where portions are public while others are private). Therefore, user 106 uses a user device 504 to access that system through cloud 502.

FIG. 6 also depicts another embodiment of a cloud architecture. FIG. 6 shows that it is also contemplated that some elements of system 100 can be disposed in cloud 502 while others are not. By way of example, data store 110 can be disposed outside of cloud 502, and accessed through cloud 502. In another embodiment, computing system 100 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
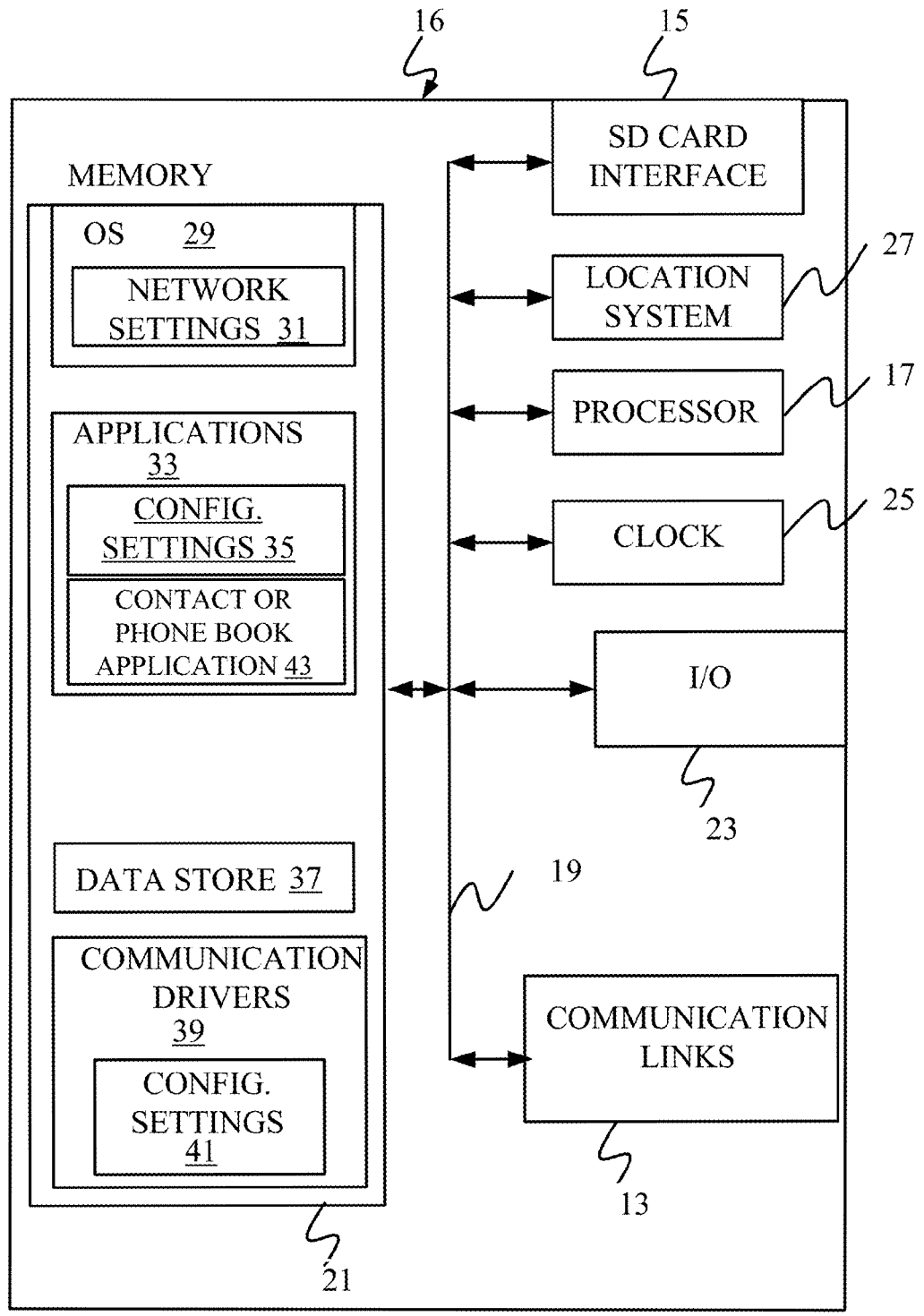
FIGS. 7-11 show various embodiments of mobile devices.

FIG. 7 is a simplified block diagram of one illustrative embodiment of a handheld or mobile computing device that can be used as a user's or client's hand held device 16, in which the present system (or parts of it) can be deployed. FIGS. 8-11 are examples of handheld or mobile devices.

FIG. 7 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 108 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Program 114, for example, can reside in memory 21. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications (or programs such as program 114) that have previously been stored on the device 16 or applications that are installed during use, although these can be part of operating system 29, or hosted external to device 16, as well.

Figure 8:
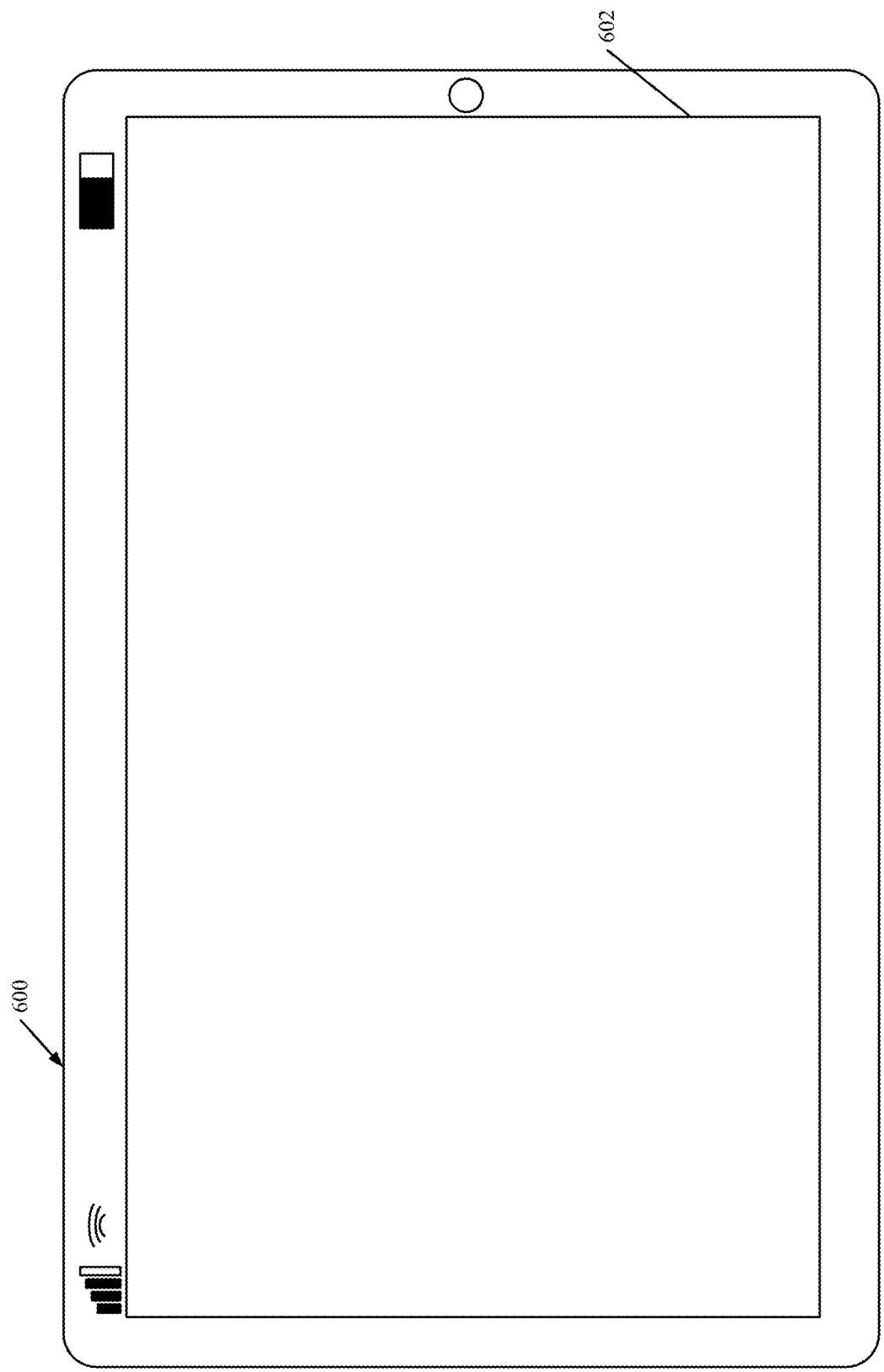

FIG. 8 shows one embodiment in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
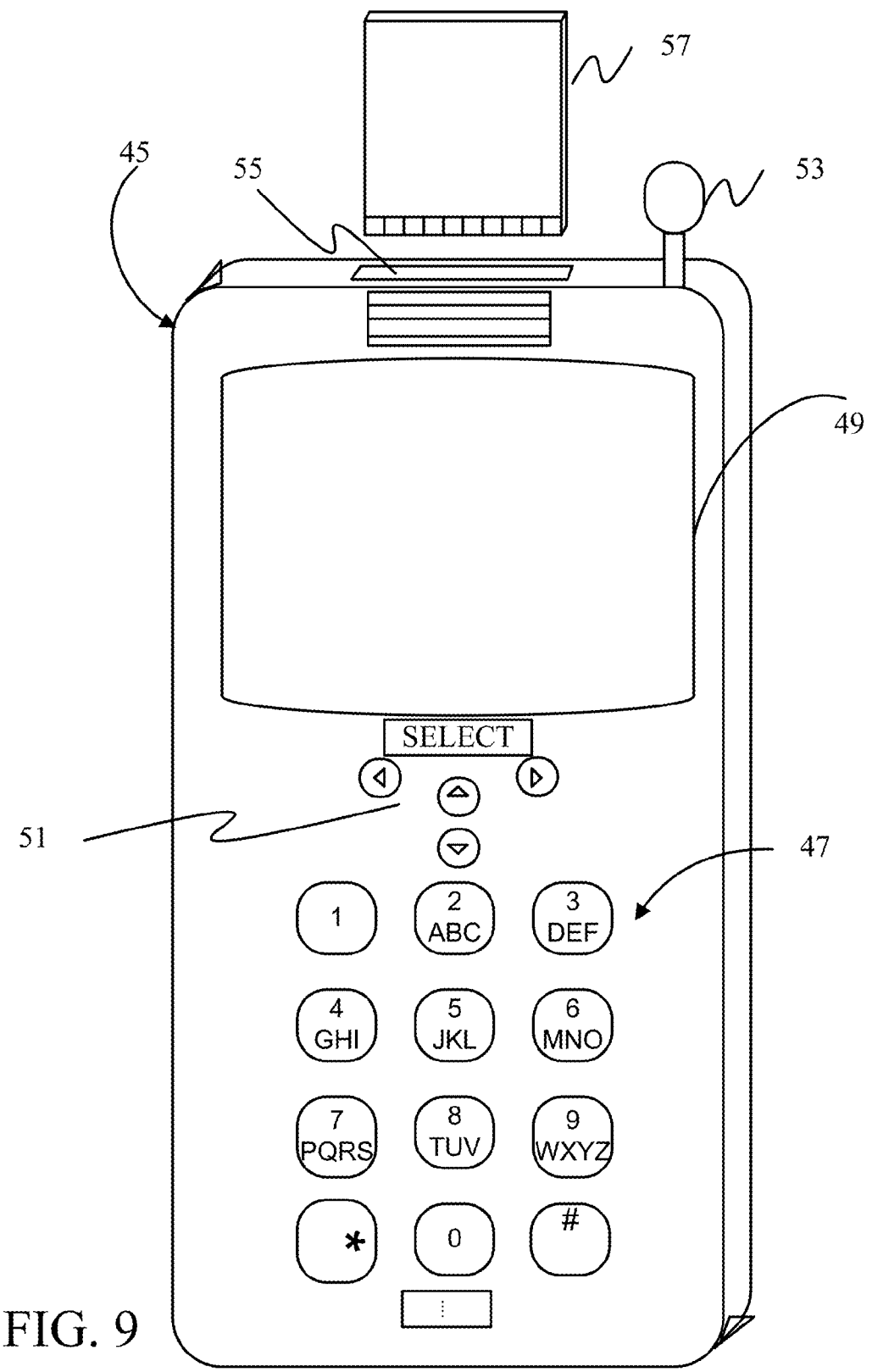
Figure 10:
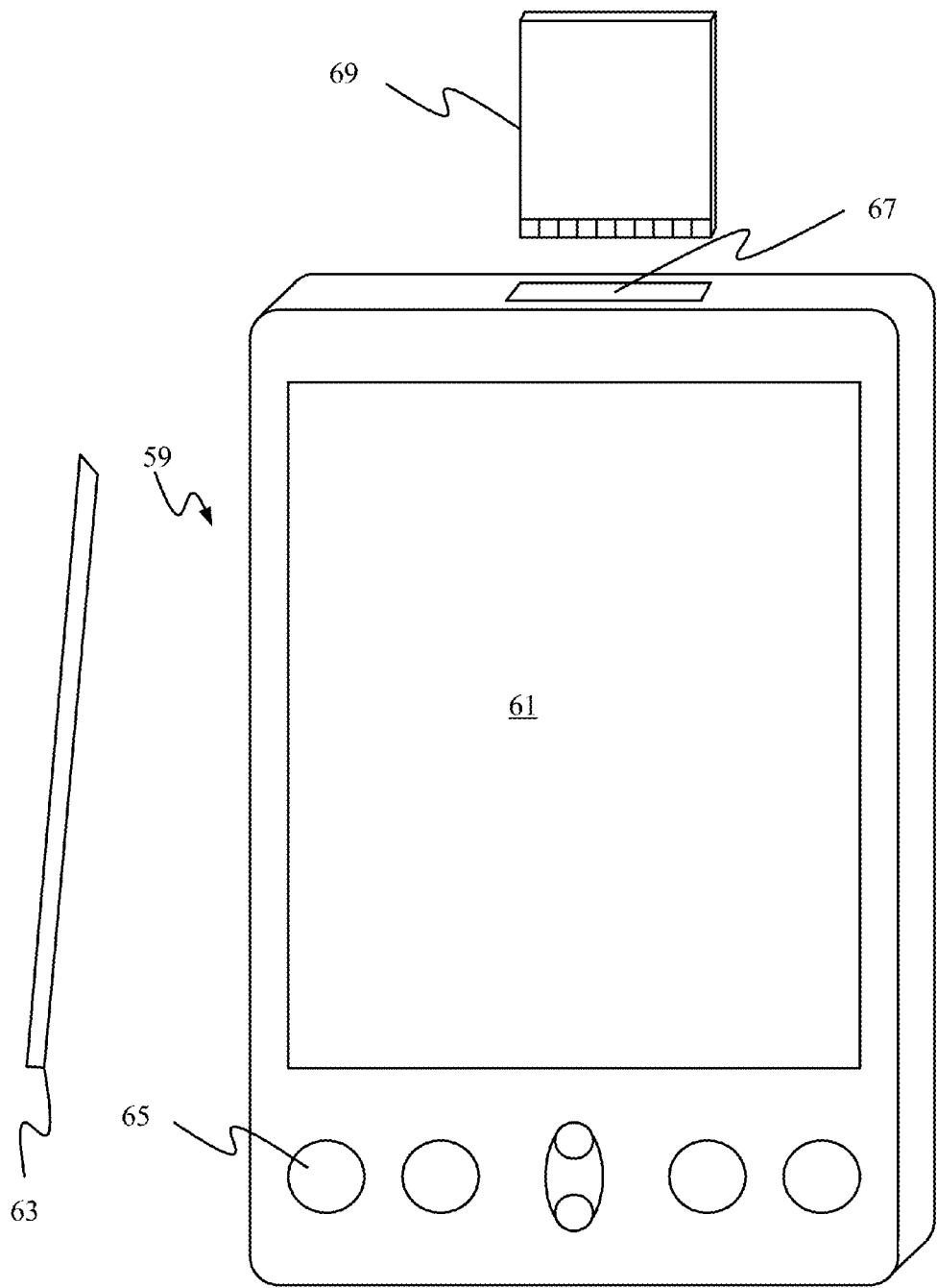

FIGS. 9 and 10 provide additional examples of devices 16 that can be used, although others can be used as well. In FIG. 9, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
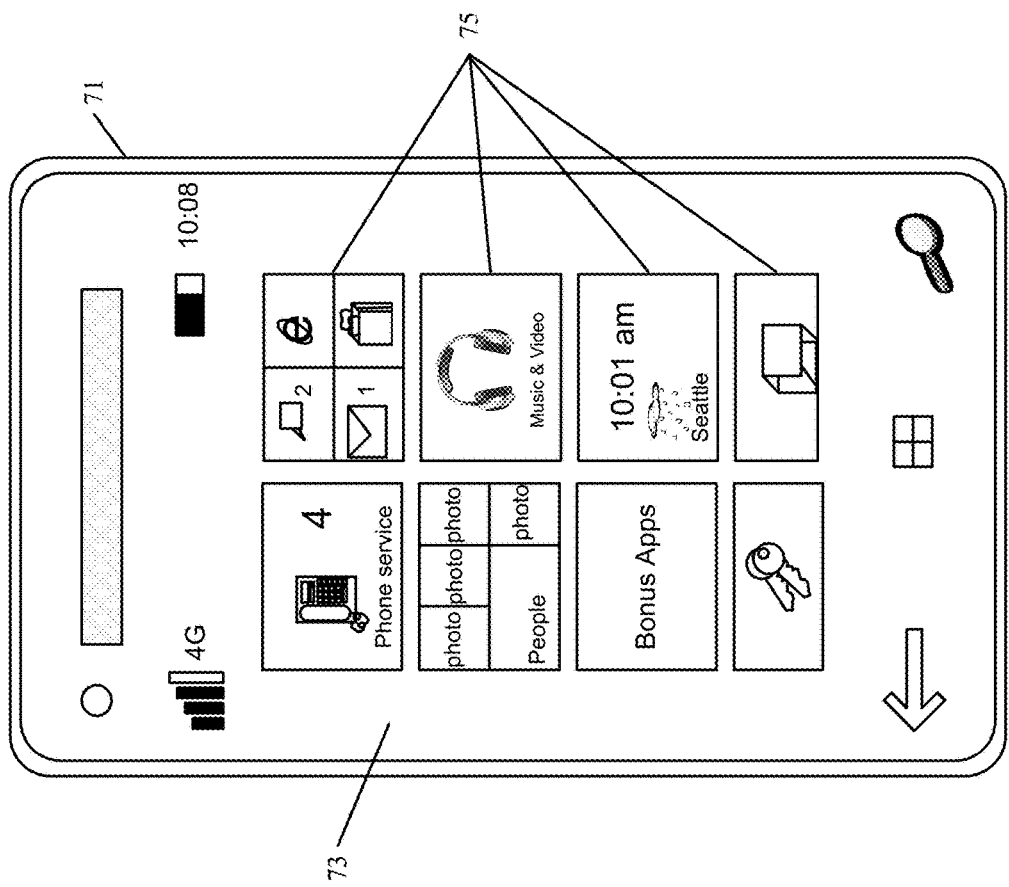

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
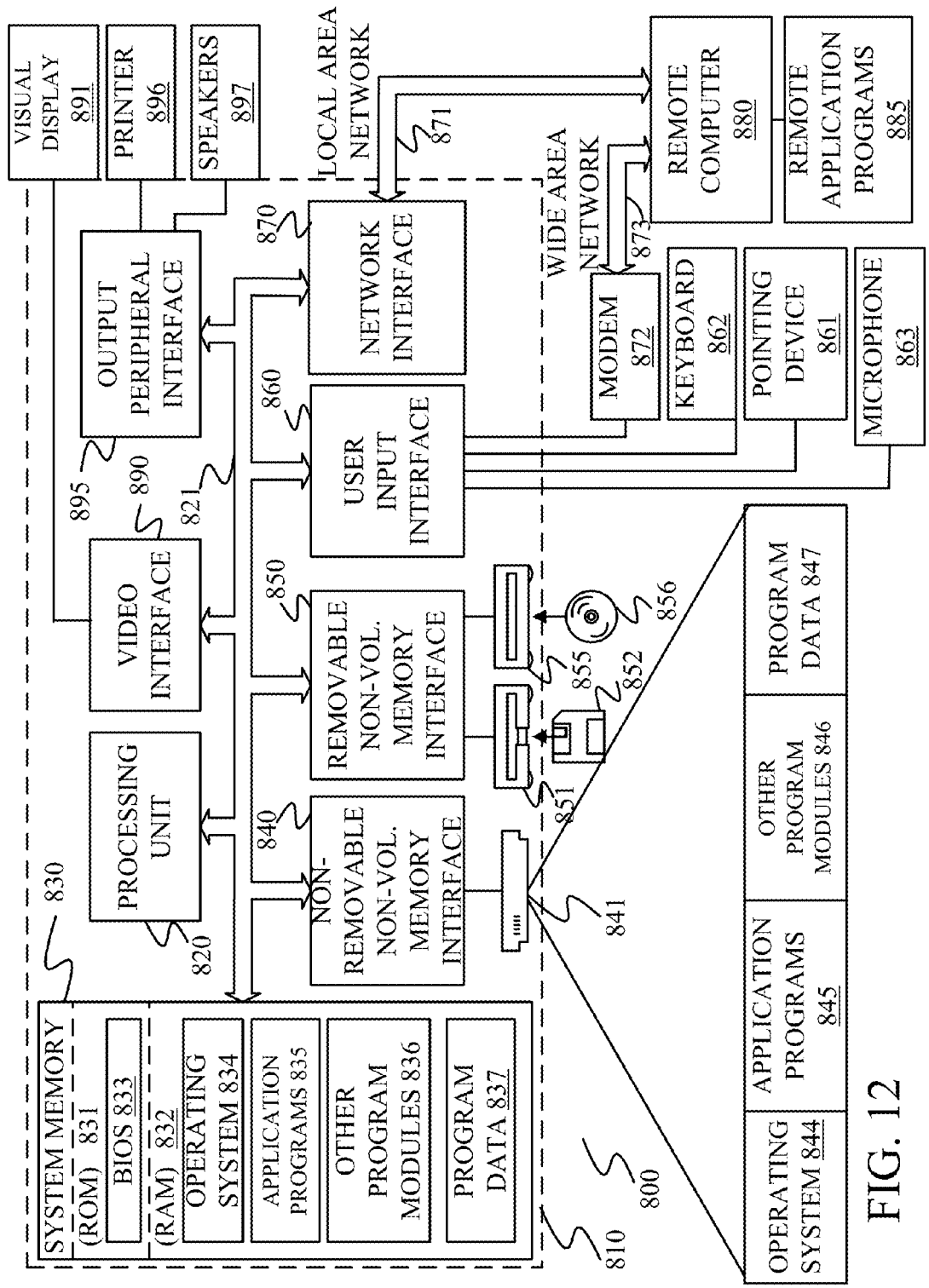
FIG. 12 is a block diagram of one illustrative computing environment.

FIG. 12 is one embodiment of a computing environment in which system 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    displaying a set of data items in a table on a user interface display,
        each data item comprising a row in the table having a plurality of cells arranged in columns, each cell displaying a corresponding value of the data item;
    receiving a user interaction input on the user interface display that directly interacts with a first cell of a first data item in the set of data items;
    in response to the user interaction input that directly interacts with the first cell of the first data item,
        automatically selecting the corresponding value displayed in the first cell of the first data item; and
        determining that group selection behavior is applied to the first cell of the first data item; and
    based on the determination that group selection behavior is applied to the first cell of the first data item,
        automatically identifying a second data item, in the displayed set of data items, that has a second cell that:
            is in a same one of the columns as the first cell of the first data item, and
            displays a value comprising a same value as the corresponding value displayed in the first cell of the first data item; and
        automatically selecting the first and second data items as a group and displaying a visual indication that the first and second data items have been selected as the group.

2. The computer-implemented method of claim 1 wherein the corresponding value displayed in the first cell of the first data item comprises at least one of a numerical value or a non-numerical value, and wherein receiving a user interaction input comprises:
    receiving a user selection input selecting the first cell of the first data item; and
    wherein displaying a visual indication comprises highlighting the first data item together with the second data item.

3. The computer-implemented method of claim 1 wherein receiving a user interaction input comprises:
    receiving a user action input performing an action on the first cell of the first data item.

4. The computer-implemented method of claim 3 further comprising:
    performing the action on the group of data items based on the user action input.

5. The computer-implemented method of claim 4 wherein receiving a user action input comprises receiving a move input visually moving the first data item on a display screen and wherein performing the action, comprises:
    visually moving the group of data items in response to the move input.

6. The computer-implemented method of claim 4 wherein receiving a user action input comprises receiving a user input dragging the first data item onto a predefined visualization and wherein performing the action comprises:
    displaying all of the data items in the group according to the predefined visualization.

7. The computer-implemented method of claim 6 wherein the predefined visualization comprises a details display that displays detailed information for each data item in the group and wherein performing the action comprises:
    displaying the details display for each of the data items in the group.

8. The computer-implemented method of claim 6 wherein the predefined visualization comprises a pivot table display that displays summary information for each data item in the group and wherein performing the action comprises:
    displaying the pivot table display summarizing the data items in the group.

9. The computer-implemented method of claim 6 wherein the predefined visualization comprises a chart display that displays information for each data item in the group and wherein performing the action comprises:
    displaying the chart view charting the information for the data items in the group.

10. The computer-implemented method of claim 1, wherein determining that group selection behavior is applied to the first cell of the first data item comprises:
    prior to automatically identifying the one or more other data items, determining whether group select behavior is assigned to the first cell of the first data item; and
        if so, performing the automatically identification of the second data item; or
        if not, processing only the first data item based on the user interaction input.

11. The computer-implemented method of claim 10 wherein the second data item is tokenized so that the second data item is identified as part of the group even if only a subset of data in the first cell of the first data item has the same value as a subset of data in the corresponding cells of the second data item.

12. A computer-implemented method, comprising:
    displaying a set of data items in a table on a user interface display,
        each data item comprising a row in the table having a plurality of cells arranged in columns, each cell displaying a corresponding value of the data item;
    receiving a user interaction input on the user interface display that directly interacts with a first cell of a first data item in the set of data items;
    in response to the user interaction input that directly interacts with the first cell of the first data item,
        determining that group selection behavior is applied to the first cell of the first data item; and
        tokenizing the first data item to combine a plurality of cells, in the first data item, to form the first combined data portion;
    in response to the determination that group selection behavior is applied to the first cell of the first data item,
        tokenizing a second data item, in the displayed set of data items, to combine the same plurality of cells to form a corresponding second combined data portion; and
        based on a determination that the second combined data portion of the tokenized second data item has the same values as the first combined data portion of the tokenized first data item, automatically selecting the first and second data items as a group and displaying a visual indication that the first and second data items have been selected as the group.

13. A computer system, comprising:
   at least one processor; and
   memory storing instructions executable by the at least one processor, wherein the instructions configure the computer system to:
      display a set of data items in a table on a user interface display, each data item comprising a row in the table having a plurality of visually separate cells arranged in columns, each cell having a corresponding value of the data item;
      receive a user interaction input interacting with a first cell of a first data item in the set of data items;
      determine whether group selection behavior is applied to the first cell of the first data item; and
      based on the determination that group selection behavior is applied to the first cell of the first data item, automatically identify a second cell in a second data item that:
         is in a same one of the columns as the first cell of the first data item, and
         displays a value comprising a same value as the corresponding value displayed in the first cell of the first data item; and
      automatically select the first and second data items as a selected group and display a visual indication that indicates the selected group.

14. The computer system of claim 13 wherein the instructions configure the computer system to:
   receive, as the user interaction input, user selection of the first cell of the first data item.

15. The computer system of claim 13 wherein the value in each cell in each data items comprises at least one of a numerical value or a non-numerical value.

16. The computer system of claim 13 wherein the instructions configure the computer system to:
   receive a user action input on the first data item; and
   perform the action on the first and second data items when the first and second data items are grouped together.

17. The computer system of claim 13, wherein the instructions configure the computer system to:
   prior to automatically identifying the second data item, determine whether group select behavior is assigned to the first cell of the first data item; and
      if so, perform the automatically identification of the second data item; or
      if not, process only the first data item based on the user interaction input.

18. The computer system of claim 17 wherein the instructions configure the computer system to:
   tokenize the first data item to combine a plurality of cells, in the first data item, to form a first combined data portion;
   tokenize the second data item to combine the same plurality of cells to form a corresponding second combined data portion; and
   select the first and second data items as the group only if the first and second combined data portions have the same values.

19. The computer system of claim 13, wherein the instructions configure the computer system to:
   receive a user action input comprises receiving a move input visually moving the first data item on a display screen; and
   visually move the group of data items in response to the move input.

20. The computer system of claim 13, wherein the instructions configure the computer system to:
   receive a user input dragging the first data item onto a predefined visualization; and
   display all of the data items in the group according to the predefined visualization.

\* \* \* \* \*